(12) United States Patent
Zhang et al.

(10) Patent No.: US 11,966,547 B2
(45) Date of Patent: Apr. 23, 2024

(54) ELECTRONIC DEVICE, AS WELL AS CONTROL METHOD AND CONTROL MODULE OF SAME

(71) Applicant: VIVO MOBILE COMMUNICATION CO., LTD., Dongguan (CN)

(72) Inventors: Kaokao Zhang, Dongguan (CN); Ling Hu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/951,066

(22) Filed: Sep. 22, 2022

(65) Prior Publication Data

US 2023/0020296 A1    Jan. 19, 2023

Related U.S. Application Data

(63) Continuation of application No. PCT/CN2021/082353, filed on Mar. 23, 2021.

(30) Foreign Application Priority Data

Mar. 25, 2020 (CN) .......................... 202010218348.3

(51) Int. Cl.
*G06F 3/044* (2006.01)
*G06F 3/041* (2006.01)
*G06V 40/13* (2022.01)

(52) U.S. Cl.
CPC .......... *G06F 3/044* (2013.01); *G06F 3/04166* (2019.05); *G06V 40/1306* (2022.01)

(58) Field of Classification Search
CPC .... G06F 3/04166; G06F 3/044; G06F 3/0416; G06F 21/32; G06V 40/1306; G06V 40/13; G06V 40/1324
See application file for complete search history.

(56) References Cited

U.S. PATENT DOCUMENTS

2005/0084261 A1* 4/2005 Takahashi ................ G03B 9/36
396/464
2009/0058598 A1* 3/2009 Sanchez Sanchez ........................
G06V 40/1306
340/5.83

(Continued)

FOREIGN PATENT DOCUMENTS

| CN | 108834354 A | 11/2018 |
|---|---|---|
| CN | 108923689 A | 11/2018 |

(Continued)

OTHER PUBLICATIONS

International Search Report issued in corresponding International Application No. PCT/CN2021/082353, dated Jul. 1, 2021, 5 pages.

(Continued)

*Primary Examiner* — Hong Zhou

(74) *Attorney, Agent, or Firm* — IPX PLLC

(57) ABSTRACT

An electronic device, a control method, a control module of the electronic device, and a computer-readable storage medium are provided. The electronic device includes: a shell; a display screen disposed in the shell; a fingerprint module movably disposed in an inner cavity; and a drive mechanism. The inner cavity is formed between the shell and the display screen. The drive mechanism is connected to the fingerprint module, and drives, in a case that the display screen is touched, the fingerprint module to move to a position corresponding to a first region. The first region is a region that is of the display screen and that is touched.

12 Claims, 2 Drawing Sheets

(56) References Cited

U.S. PATENT DOCUMENTS

| | | | |
|---|---|---|---|
| 2011/0187495 A1 | 8/2011 | Weng et al. | |
| 2017/0003770 A1 | 1/2017 | Akhavan Fomani et al. | |
| 2018/0173922 A1 | 6/2018 | Ghavanini et al. | |
| 2018/0239433 A1* | 8/2018 | Akabane | G06F 3/045 |
| 2018/0285619 A1 | 10/2018 | Kim et al. | |
| 2019/0228139 A1 | 7/2019 | Oh et al. | |
| 2019/0294770 A1* | 9/2019 | Han | G06V 40/13 |
| 2021/0200327 A1* | 7/2021 | Ma | G06F 3/0227 |

FOREIGN PATENT DOCUMENTS

| | | |
|---|---|---|
| CN | 109241957 A | 1/2019 |
| CN | 109375714 A | 2/2019 |
| CN | 111443825 A | 7/2020 |

OTHER PUBLICATIONS

First Office Action issued in related Chinese Application No. 202010218348.3 dated Jan. 30, 2022, 10 pages.
Second Office Action issued in related Chinese Application No. 202010218348.3 dated May 25, 2022, 13 pages.
Extended European Search Report issued in related European Application No. 21774272.5, dated Aug. 21, 2023, 19 pages.
Egawa S et al:" Film actuators: Planar, electrostatic surface-drive actuators", Proceeding of the Workshop on Micro Electro Mechanical Systems, vol. workshop 4, XP010039598, Jan. 1991, pp. 9-14.

* cited by examiner

ELECTRONIC DEVICE, AS WELL AS CONTROL METHOD AND CONTROL MODULE OF SAME

CROSS-REFERENCE TO RELATED APPLICATIONS

This application is a continuation of International Application No. PCT/CN2021/082353, filed on Mar. 23, 2021, which claims priority to Chinese Patent Application No. 202010218348.3, filed on Mar. 25, 2020. The entire contents of each of the above-referenced applications are expressly incorporated herein by reference.

TECHNICAL FIELD

The present disclosure relates to the field of communications technologies, and in particular, to an electronic device, a control method and a control module of the same, and a computer-readable storage medium.

BACKGROUND

With the rapid development of electronic devices, an electronic device is used more and more widely, and electronic devices such as a mobile phone, a tablet computer, and the like play an increasingly important role in people's work, life, entertainment, and other aspects. In addition, with the increase of users' demands, a screen-to-body ratio of an electronic device is increasing.

To maximize the screen-to-body ratio of the electronic device, a fingerprint module for unlocking or payment may be disposed in or under a screen of the electronic device; and a fingerprint recognition function may be implemented through an optical fingerprint recognition module or an ultrasonic module. Therefore, an impact of the fingerprint module on the screen-to-body ratio of the electronic device can be avoided.

However, in this way, the fingerprint module can only be fixed at a certain position in or under the screen of the electronic device. As a result, to implement an unlocking function or another function, a user needs to accurately touch the position of the fingerprint module, which seriously affects user's experience.

SUMMARY

The present disclosure discloses an electronic device, as well as a control method and a control module of the same.

According to a first aspect, an embodiment of the present disclosure provides an electronic device. The electronic device includes:
  a shell;
  a display screen, where the display screen is disposed in the shell, and an inner cavity
  is formed between the shell and the display screen;
  a fingerprint module, where the fingerprint module is movably disposed in the inner
  cavity; and
  a drive mechanism, where the drive mechanism is connected to the fingerprint module, and drives, in a case that the display screen is touched, the fingerprint module to move to a position corresponding to a first region, and the first region is a region that is of the display screen and that is touched.

According to a second aspect, an embodiment of the present disclosure provides a control method of an electronic device. The control method includes:
  obtaining a touch position of user's finger on a display screen; and
  controlling a drive mechanism to drive a fingerprint module to move to a region corresponding to the touch position.

According to a third aspect, an embodiment of the present disclosure provides an electronic device. The electronic device includes a processor, a memory, and a computer program stored in the memory and executable on the processor, where when the computer program is executed by the processor, the actions of the foregoing control method are implemented.

In the electronic device disclosed in the embodiments of the present disclosure, a drive mechanism can drive a fingerprint module to move in an inner cavity, so that the fingerprint module can move to a position corresponding to any region of a display screen. In the embodiments of the present disclosure, the fingerprint module can move to a region corresponding to user's finger.

BRIEF DESCRIPTION OF DRAWINGS

The accompanying drawings described herein are used to provide further understanding of the present disclosure and constitute a part of the present disclosure. The exemplary embodiments of the present disclosure and descriptions thereof are used to explain the present disclosure, and do not constitute an improper limitation on the present disclosure. In the accompanying drawings.

DETAILED DESCRIPTION

Figure 1:
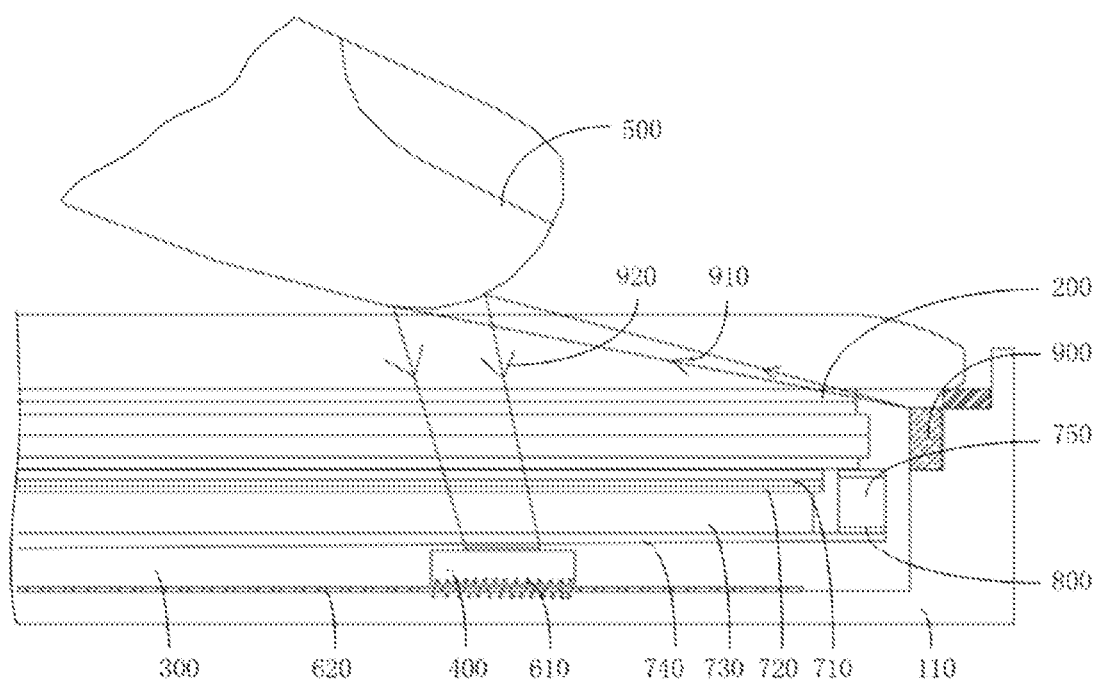
FIG. 1 is a structural schematic diagram of an electronic device according to an embodiment of the present disclosure.
Figure 2:
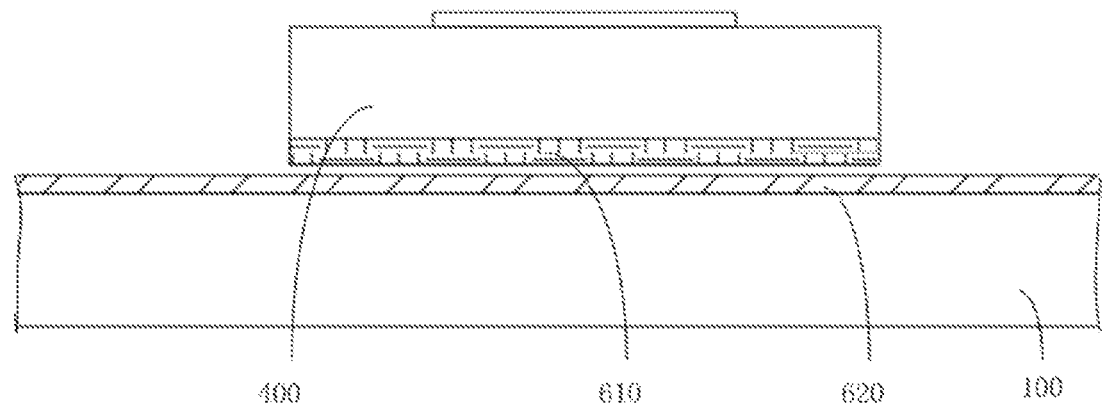
FIG. 2 is a schematic diagram of a partial structure of an electronic device according to an embodiment of the present disclosure.
Figure 3:
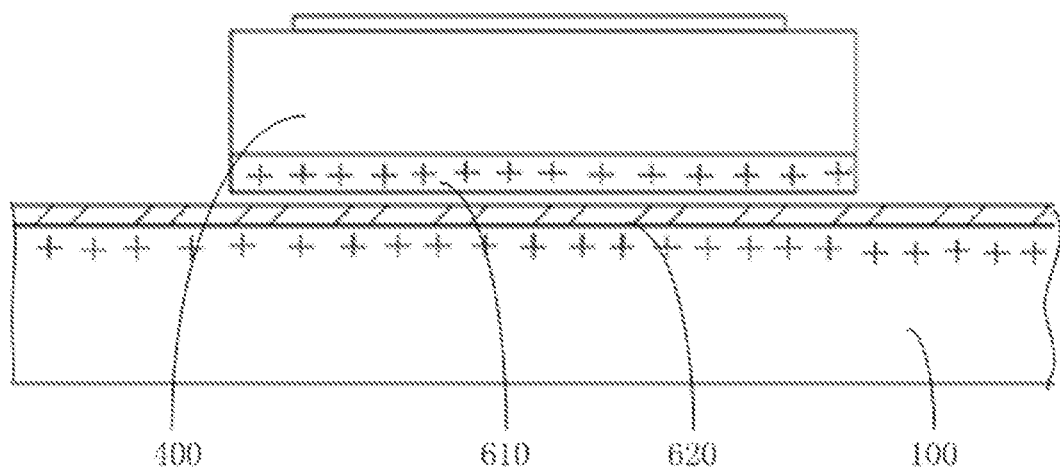
FIG. 3 is a schematic diagram of a partial structure of an electronic device in a state according to an embodiment of the present disclosure.
Figure 4:
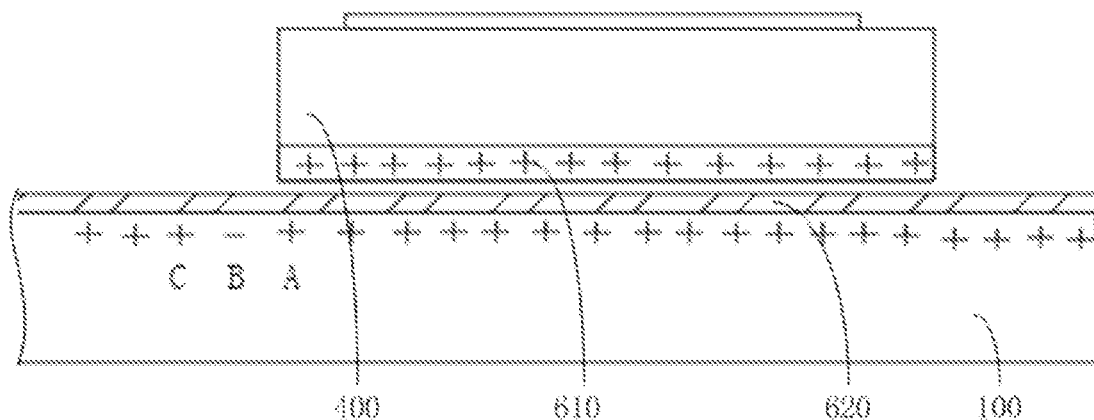
FIG. 4 is a schematic diagram of a partial structure of an electronic device in another state according to an embodiment of the present disclosure.

Technical solutions, and advantages of the present disclosure are described together with accompanying drawings. The following briefly describes the accompanying drawings. Apparently, the described embodiments are merely some rather than all of the embodiments of the present disclosure. All other embodiments obtained by a person of ordinary skill in the art on the basis of the embodiments of the present disclosure without creative efforts shall fall within the protection scope of the present disclosure.

The technical solutions disclosed by the embodiments of the present disclosure are described in detail below with reference to the accompanying drawings.

As shown in FIG. 1 to FIG. 4, an embodiment of the present disclosure discloses an electronic device. The electronic device includes a shell 100, a display screen 200, a fingerprint module 400, and a drive mechanism.

The shell 100 is a peripheral component of the electronic device, and can provide mounting positions for other components of the electronic device.

The display screen 200 is disposed in the shell 100. In this case, an inner cavity 300 is formed between the shell 100 and the display screen 200. The inner cavity 300 can provide a mounting position for a main component of the electronic device, so that a structure of the electronic device can be relatively compact.

In this embodiment of the present disclosure, the fingerprint module 400 is movably disposed in the inner cavity 300. For example, the fingerprint module 400 can move in the inner cavity 300 under the action of external force. It should be noted that, the fingerprint module 400 can move to a position corresponding to any region of the display screen 200.

The drive mechanism is connected to the fingerprint module 400, and can drive the fingerprint module 400 to move in the inner cavity 300, so that the fingerprint module 400 can move to a position corresponding to any region of the display screen 200.

In an operating process, when a user needs to unlock the electronic device, user's finger 500 first touches the display screen 200. In a case that the display screen 200 is touched, a control module of the electronic device drives the fingerprint module 400 to move to a position corresponding to a first region, where the first region is a region that is of the display screen 200 and that is touched, and the control module is a Central Processing Unit, (CPU) of the electronic device. It should be noted that, in this specification, the fingerprint module 400 moves to the position corresponding to the first region, so that when user's finger 500 touches the first region, the fingerprint module 400 is at a position corresponding to user's finger 500, that is, the fingerprint module 400 faces user's finger 500. Then, the fingerprint module 400 can perform fingerprint recognition on user's finger 500, thereby unlocking the electronic device.

It can be learned from the above that, in the electronic device disclosed in this embodiment of the present disclosure, the drive mechanism can drive the fingerprint module 400 to move in the inner cavity 300, so that the fingerprint module 400 can move to a position corresponding to any region of the display screen 200. In this embodiment of the present disclosure, the fingerprint module 400 can move to a region corresponding to user's finger 500, so that user's finger 500 can by touch any position of the display screen 200 to unlock the electronic device, thereby increasing unlock efficiency. Therefore, the user can unlock the electronic device conveniently, thereby having better use experience.

In this embodiment of the present disclosure, the drive mechanism includes a first conductive part 610 and a second conductive part 620. The first conductive part 610 is disposed in the fingerprint module 400. The second conductive part 620 is disposed in the inner cavity 300. The first conductive part 610 is disposed opposite the second conductive part 620. In this case, in an operation process, a polarity of a charge carried in the second conductive part 620 changes, thereby driving the first conductive part 610 to move. Therefore, the fingerprint module 400 can move in the inner cavity 300.

In some embodiments, the first conductive part 610 includes a first charged region, and the second conductive part 620 includes a second charged region and a third charged region. In a case that the display screen 200 is touched, a first charge carried in the first charged region, a second charge carried in the second charged region, and a third charge carried in the third charged region drives the fingerprint module 400 to be suspended in the inner cavity 300, and to move from a first position to a second position, so that the fingerprint module 400 can reach a specified position to perform fingerprint recognition.

In some embodiments, in a case that the fingerprint module 400 is at the first position, the first charged region is disposed opposite the second charged region, and a polarity of the first charge carried in the first charged region is the same as that of the second charge carried in the second charged region. In this case, according to a principle that charges having same polarities repel each other, the first charged region and the second charged region exert repelling force on each other, so that the fingerprint module 400 is driven to be suspended in the inner cavity 300. Therefore, the fingerprint module 400 can move conveniently.

Further, a polarity of at least part of the third charge carried in the third charged region is opposite to that of the first charge carried in the first charged region. In this case, according to a principle that charges having opposite polarities attract each other, the third charged region exerts attracting force in a direction of the first charged region, so that the fingerprint module 400 is driven to move from the first position to the second position. For example, referring to FIG. 4, a region where charge A is disposed is the second charged region. A polarity of charge A is the same as that of the first charge carried in the first charged region, so that the fingerprint module 400 can be suspended in the inner cavity 300. Further, a region where charge B and charge C are disposed is the third charged region. A polarity of charge B is opposite to that of the first charge carried in the first charged region, so that the fingerprint module 400 can move towards the third charged region. In addition, when the fingerprint module 400 moves to a position corresponding to the third charged region, a polarity of charge C is the same as that of the first charge carried in the first charged region, so that the fingerprint module 400 can be suspended in the inner cavity 300.

In a case that the fingerprint module 400 is at the second position, the first charged region is disposed opposite the third charged region, and a polarity of the first charge is the same as that of the third charge, so that the fingerprint module 400 can be suspended in the inner cavity 300. The polarity of the first charge changes in this process. Therefore, a suspended state is maintained according to the principle that charges having same polarities repel each other. The second position is the position corresponding to the first region of the display screen 200, that is, the second position is a position corresponding to the region that is of the display screen 200 and that is touched, so that a position of the fingerprint module 400 is opposite the position corresponding to the region that is of the display screen 200 and that is touched. Therefore, the fingerprint module 400 can perform fingerprint recognition.

In this embodiment of the present disclosure, the shell 100 includes a middle frame 110. The display screen 200 is connected to the middle frame 110. The inner cavity 300 is formed between the display screen 200 and the middle frame 110. The first conductive part 610 is disposed on a surface, far away from the display screen 200, of the fingerprint module 400. The second conductive part 620 is disposed on a surface, facing the fingerprint module 400, of the middle frame 110. In this case, the inner cavity 300 formed between the display screen 200 and the middle frame 110 provides convenience for movement of the fingerprint module 400, so that movement of the fingerprint module 400 is prevented from being impacted by another component in the electronic device. Therefore, the fingerprint module 400 can move in a larger range. This enables the user to unlock the electronic device conveniently.

The electronic device further includes a backlight module. The backlight module is mounted on a side, facing the inner cavity 300, of the display screen 200. In some embodiments, the backlight module includes a light-enhancing part 710, a diffusion part 720, a light-guiding part 730, and a reflection part 740 that are sequentially disposed in a direction of the inner cavity 300. The backlight module can supply the display screen 200 with sufficient brightness and uniformly distributed light sources, so that the display screen 200 can display an image normally.

Further, the electronic device further includes a rubber frame 750. The rubber frame 750 is disposed in the inner cavity 300. The reflection part 740 is connected to the rubber frame 750 via optical clear adhesive 800. Based on this, compared with the existing electronic device, the electronic device in this embodiment of the present disclosure does not need an iron frame, which facilitates thinning design of the electronic device.

In this embodiment of the present disclosure, the electronic device further includes a light-emitting component 900. The light-emitting component 900 may be disposed in the shell 100. The fingerprint module 400 is an optical fingerprint module. In a case that user's finger 500 touches the display screen 200, the light-emitting component 900 emits light to the first region of the display screen 200, so that the light-emitting component 900 emits the light to user's finger 500. Further, the light shone on user's finger 500 is reflected to shine on the fingerprint module 400. Referring to FIG. 1, a first arrow 910 in FIG. 1 is an emergent direction of the light; and a second arrow 920 in FIG. 1 is a direction in which the light is reflected by user's finger 500. In this case, the light-emitting component 900 can provide a sufficient light source for the fingerprint module 400, so that the fingerprint module 400 can implement a fingerprint recognition function in a relatively dark environment. Therefore, user's experience is improved. In some embodiments, the middle frame 110 is provided with mounting space. The light-emitting component 900 is disposed in mounting space, to facilitate mounting of the light-emitting component 900.

Further, to avoid an impact of the backlight module on fingerprint recognition of the fingerprint module 400, all of the light-enhancing part 710, the diffusion part 720, and the reflection part 740 is made of a 3M material. The 3M material is a reflection material formed by compounding a reflection layer of glass beads with a polymer material such as Polyvinyl chloride, (PVC) and Polyurethane, (PU). In this case, in a case that lights enters and exits the backlight module, the 3M material can avoid great loss of the light source. Therefore, the fingerprint module 400 can implement the fingerprint recognition function well. The 3M material in this specification is a well-known material. Both a material proportion and a forming process are known technologies. Details are not described in this specification.

The fingerprint module 400 disclosed in this embodiment of the present disclosure is not limited to the optical fingerprint module, and may be a capacitive fingerprint module or the like. A type of the fingerprint module 400 is not limited in the embodiments of the present disclosure.

In addition, the drive mechanism disclosed in this embodiment of the present disclosure is not limited to the type described above, and may be another device that can drive the fingerprint module 400 to move, for example, a liner motor, a hydraulic telescopic component, or a combination of other drive mechanisms that can drive a component to move in a plurality of directions.

Based on the electronic device disclosed in this embodiment of the present disclosure, an embodiment of the present disclosure further discloses a control method of the electronic device. The control method includes the following actions:

Action 100: Receive an input of user's finger 500 on the display screen 200, where a position of the input on the display screen 200 is a first region.

Action 200: Obtain the position of the input on the display screen 200 in response to the input.

The first region herein is any position on the display screen 200, that is, user's finger 500 may touch any position on the display screen 200.

Action 300: Control the drive mechanism to drive the fingerprint module 400 to move to a position corresponding to the first region.

After a touch position on the first region of the display screen 200 is obtained, the drive mechanism can be controlled to drive the fingerprint module 400 to move to the position corresponding to the first region. Then, the fingerprint module 400 can perform fingerprint recognition on user's finger 500.

To facilitate use of a fingerprint unlocking function of the electronic device by the user, action 200 includes the following actions:

Action 210: Receive a tactile signal generated when user's finger 500 touches the display screen 200.

Action 220: Perform position recognition on a position of user's finger 500 in response to the tactile signal, to obtain the position corresponding to the first region.

In some embodiments, when using the fingerprint unlocking function of the electronic device, the user first triggers a fingerprint recognition function of the electronic device by touching any position of the display screen 200. In this case, a mainboard of the electronic device senses position information of the user's finger 500 based on a change of a capacitance of the display screen 200, thereby receiving the tactile signal generated when user's finger 500 touches the display screen 200. Further, position recognition is performed on the position of user's finger 500 in response to the tactile signal, to obtain the position corresponding to the first region.

To enable movement of the fingerprint module 400 to be implemented better, in an optional solution, the drive mechanism includes a first conductive part 610 and a second conductive part 620. The first conductive part 610 is disposed in the fingerprint module 400. The second conductive part 620 is disposed in the inner cavity 300. The first conductive part 610 is disposed opposite the second conductive part 620. The first conductive part 610 includes a first charged region. The second conductive part 620 includes a second charged region and a third charged region. In this case, action 300 includes the following actions.

Action 310: Control the first charged region to be disposed opposite the second charged region, and a polarity of a first charge carried in the first charged region to be the same as that of a second charge carried in the second charged region.

In a process of touching the display screen 200 by user's finger 500, the first charged region is controlled to be disposed opposite the second charged region, and the polarity of the first charge carried in the first charged region is controlled to be the same as that of the second charge carried in the second charged region, so that the fingerprint module 400 can be suspended in the inner cavity 300. Therefore, movement of the fingerprint module 400 can be implemented conveniently.

Action 320: Control a polarity of at least part of a third charge carried in the third charged region to be opposite to that of the first charge carried in the first charged region, thereby driving the fingerprint module 400 to move to a position corresponding to the third charged region, where the third charged region is disposed opposite the first region.

The polarity of at least part of the third charge carried in the third charged region is controlled to be opposite to that of the first charge carried in the first charged region, so that the third charged region can exert attracting force on the first charged region, thereby attracting the first conductive part 610 and further driving the fingerprint module 400 to move. Therefore, the fingerprint module 400 is driven to move to the position corresponding to the third charged region. The third charged region is disposed opposite the first region. The first region is a region that is of the display screen 200 and that is touched.

Based on the control method in any one of the foregoing embodiments, an embodiment of the present disclosure further provides a control module. The control module includes:
  a receiving module, configured to receive an input of user's finger 500 on the display screen 200;
  an obtaining module, configured to obtain a position of the input on the display screen 200 in response to the input; and
  a controlling module, configured to control the drive mechanism to drive the fingerprint module 400 to move to a position corresponding to a first region, where the position of the input on the display screen 200 is the position corresponding to the first region.

Further, referring to all the above, to facilitate use of the fingerprint unlocking function of the electronic device by the user, the obtaining module includes a receiving unit and a recognition unit. The receiving unit is configured to receive a tactile signal generated when user's finger 500 touches the display screen 200. The recognition unit is configured to perform position recognition on a position of user's finger 500 in response to the tactile signal, to obtain the position corresponding to the first region.

To ensure that movement of the fingerprint module 400 can be implemented better, the controlling module includes a first control unit and a second control unit. The first control unit is configured to control the first charged region to be disposed opposite the second charged region, and a polarity of a first charge carried in the first charged region to be the same as that of a second charge carried in the second charged region. The second control unit is configured to control a polarity of at least part of a third charge carried in the third charged region to be opposite to that of the first charge carried in the first charged region, thereby driving the fingerprint module 400 to move to the position corresponding to the first region.

An embodiment of the present disclosure further discloses an electronic device, including a processor, a memory, and a computer program stored in the memory and executable on the processor. When the computer program is executed by the processor, the actions of the control method in any one of the foregoing embodiments are implemented.

An embodiment of the present disclosure further discloses a computer-readable storage medium. The computer-readable storage medium stores a computer program, where when the computer program is executed by a processor, the actions of the control method in any one of the foregoing embodiments are implemented.

The electronic device disclosed in this embodiment of the present disclosure may be a smart phone, a tablet computer, an ebook reader, a wearable device (for example, a smart watch), a video game console, and the like. A type of the electronic device is not limited in this embodiment of the present disclosure.

The embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, but are not intended to limit the present disclosure. Various changes and modifications may be made to the present disclosure by those skilled in the art. Any modifications, equivalent substitutions, improvements, and the like made within the spirit and principle of the present disclosure should be included within the scope of the claims of the present disclosure.

What is claimed is:

1. An electronic device, comprising:
  a shell;
  a display screen, wherein the display screen is disposed in the shell, and an inner cavity is formed between the shell and the display screen;
  a fingerprint module movably suspended in the inner cavity; and
  a drive mechanism connected to the fingerprint module and configured to drive, in response to the display screen being touched at a first region, the suspended fingerprint module by electrostatic force to move to a position corresponding to the first region in at least two directions.

2. The electronic device according to claim 1, wherein:
  the drive mechanism comprises a first conductive part and a second conductive part,
  the first conductive part is disposed in the fingerprint module,
  the second conductive part is disposed in the inner cavity, and
  the first conductive part is disposed opposite the second conductive part, wherein the first conductive part comprises a first charged region, and the second conductive part comprises a second charged region and a third charged region,
  wherein:
    in a case that the display screen is touched, a first charge carried in the first charged region, a second charge carried in the second charged region, and a third charge carried in the third charged region drive the fingerprint module to be suspended in the inner cavity, and to move from a first position to a second position;
    in a case that the fingerprint module is at the first position, the first charged region is disposed opposite the second charged region, a polarity of the first charge is the same as that of the second charge, and a polarity of at least part of the third charge is opposite to that of the first charge; or
    in a case that the fingerprint module is at the second position, the first charged region is disposed opposite the third charged region, and a polarity of the first charge is the same as that of the third charge, wherein the second position is the position corresponding to the first region of the display screen.

3. The electronic device according to claim 2, wherein:
the shell comprises a middle frame,
the display screen is connected to the middle frame,
the inner cavity is formed between the display screen and the middle frame,
the first conductive part is disposed on a surface, far away from the display screen, of the fingerprint module, and
the second conductive part is disposed on a surface, facing the fingerprint module, of the middle frame.

4. The electronic device according to claim 3, further comprising:
a backlight module mounted on a side, facing the inner cavity, of the display screen, wherein the blacklight module comprises:
a light-enhancing part,
a diffusion part,
a light-guiding part, and
a reflection part that are sequentially disposed in a direction of the inner cavity.

5. The electronic device according to claim 4, further comprising a rubber frame disposed in the inner cavity, wherein the reflection part is connected to the rubber frame using optical clear adhesive.

6. The electronic device according to claim 1, further comprising a light-emitting component disposed in the shell, wherein the fingerprint module is an optical fingerprint module, and in a case that the display screen is touched, the light-emitting component emits light to the first region.

7. A control method, performed by an electronic device, comprising:
receiving an input on a display screen of the electronic device in response to the display screen being touched by a user at a first region, wherein the display screen is disposed in a shell, and an inner cavity is formed between the shell and the display screen;
obtaining a position on the display screen corresponding to the first region based on the input; and
controlling a drive mechanism to drive a fingerprint module suspended in the inner cavity to move to the position corresponding to the first region by electrostatic force in at least two directions.

8. The control method according to claim 7, wherein obtaining the position on the display screen comprises:
receiving a tactile signal generated when the user touches the display screen; and
performing position recognition based on the tactile signal to obtain the position corresponding to the first region.

9. The control method according to claim 7, wherein:
the drive mechanism comprises a first conductive part and a second conductive part,
the first conductive part is disposed in the fingerprint module,
the second conductive part is disposed in the inner cavity,
the first conductive part is disposed opposite the second conductive part,
the first conductive part comprises a first charged region, and
the second conductive part comprises a second charged region and a third charged region, wherein controlling the drive mechanism to drive the fingerprint module to move to the position corresponding to the first region comprises:
controlling the first charged region to be disposed opposite the second charged region, and a polarity of a first charge carried in the first charged region to be the same as that of a second charge carried in the second charged region; and
controlling a polarity of at least part of a third charge carried in the third charged region to be opposite to that of the first charge carried in the first charged region, thereby driving the fingerprint module to move to a position corresponding to the third charged region, wherein the third charged region is disposed opposite the first region.

10. An electronic device, comprising:
a shell;
a display screen, wherein the display screen is disposed in the shell, and an inner cavity is formed between the shell and the display screen;
a fingerprint module movably suspended in the inner cavity;
a drive mechanism connected to the fingerprint module;
a memory having a computer program stored thereon; and
a processor, wherein the computer program, when executed by the processor, causes the processor to perform a control method comprising:
receiving an input on the display screen in response to the display screen being touched by a user at a first region;
obtaining a position on the display screen corresponding to the first region based on the input; and
controlling the drive mechanism to drive the suspended fingerprint module by electrostatic force to move to the position corresponding to the first region in at least two directions.

11. The electronic device according to claim 10, wherein obtaining the position on the display screen comprises:
receiving a tactile signal generated when the user touches the display screen; and
performing position recognition based on the tactile signal to obtain the position corresponding to the first region.

12. The electronic device according to claim 10, wherein:
the drive mechanism comprises a first conductive part and a second conductive part,
the first conductive part is disposed in the fingerprint module,
the second conductive part is disposed in the inner cavity,
the first conductive part is disposed opposite the second conductive part,
the first conductive part comprises a first charged region, and
the second conductive part comprises a second charged region and a third charged region, wherein controlling the drive mechanism to drive the fingerprint module to move to the position corresponding to the first region comprises:
controlling the first charged region to be disposed opposite the second charged region, and a polarity of a first charge carried in the first charged region to be the same as that of a second charge carried in the second charged region; and
controlling a polarity of at least part of a third charge carried in the third charged region to be opposite to that of the first charge carried in the first charged region, thereby driving the fingerprint module to move to a position corresponding to the third charged region, wherein the third charged region is disposed opposite the first region.

* * * * *